United States Patent
Becraft et al.

(10) Patent No.: US 6,259,107 B1
(45) Date of Patent: Jul. 10, 2001

(54) APPARATUS FOR TREATING AN ARTICLE CONTAINING AN OXIDIZABLE ORGANIC COMPOUND

(75) Inventors: Michael L. Becraft, Woodstock, MD (US); Martin J. Ecoff, Greer, SC (US); R. Karina Sylvia, Greenville, SC (US); Jeffrey A. Thomas, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/217,516

(22) Filed: Dec. 21, 1998

Related U.S. Application Data

(62) Division of application No. 08/960,002, filed on Oct. 29, 1997, now Pat. No. 5,904,960.

(51) Int. Cl.[7] .............................. B05D 3/06; C09K 15/04
(52) U.S. Cl. ................................ 250/504 R; 250/496.1; 250/494.1; 426/240; 426/248; 427/558; 252/188.28
(58) Field of Search ................ 252/188.28; 426/240, 426/248; 250/496.1, 494.1, 504 R; 427/558

(56) References Cited

U.S. PATENT DOCUMENTS

| | | | |
|---|---|---|---|
| 5,021,515 | 6/1991 | Cochran et al. | 525/371 |
| 5,089,323 | 2/1992 | Nakae et al. | 428/420 |
| 5,211,875 | 5/1993 | Speer et al. | 252/188 |
| 5,310,497 | 5/1994 | Speer et al. | 252/188 |
| 5,350,622 | 9/1994 | Speer et al. | 428/215 |
| 5,378,428 | 1/1995 | Inoue et al. | 422/9 |
| 5,399,289 | 3/1995 | Speer et al. | 252/188 |
| 5,425,896 | 6/1995 | Speer et al. | 252/188 |
| 5,498,364 | 3/1996 | Speer et al. | 252/188 |
| 5,811,027 | * 9/1998 | Ve Speer et al. | 252/188.28 |
| 5,911,910 | * 6/1999 | Becraft et al. | 252/188.28 |

FOREIGN PATENT DOCUMENTS

| | | |
|---|---|---|
| 25 30 099 | 1/1977 | (DE) . |
| 0 355 982 A2 | 7/1989 | (EP) . |
| 0 451 762 A2 | 4/1991 | (EP) . |
| 5-32277 | 2/1993 | (JP) . |
| 5-51048 | 3/1993 | (JP) . |
| 5-51049 | 3/1993 | (JP) . |
| 5-247276 | 9/1993 | (JP) . |
| 94/12590 | 6/1994 | (WO) . |
| 97/32924 | 9/1997 | (WO) . |
| 97/32925 | 9/1997 | (WO) . |

OTHER PUBLICATIONS

Volatile Compounds Extracted from Polypropylene Sheets by Hot Water: Influence of the Temperature of Sheets Injection, *Journal of Applied Polymer Science*, vol. 49 p.1159–1164 (1993).

McGraw–Hill Encyclopedia of Science & Technology, 1977, vol. 13, pp. 205–206.

McGraw–Hill Encylcopedia of Science & Technology, 1977, vol. 4, pp. 267–272.

* cited by examiner

Primary Examiner—Bruce C. Anderson
Assistant Examiner—Nikita Wells
(74) Attorney, Agent, or Firm—Mark B. Quatt

(57) ABSTRACT

An apparatus includes providing an article having an oxidizable organic compound and an organoleptic compound; advancing the article toward a means for treating the article, the means for treating the article including a treating medium, and a means for applying the treating medium to the article; and applying the treating medium to a surface of the article so as to lower the amount of the organoleptic compound in the article.

20 Claims, 4 Drawing Sheets

APPARATUS FOR TREATING AN ARTICLE CONTAINING AN OXIDIZABLE ORGANIC COMPOUND

This application is a divisional application of application Ser. No. 08/960,002 filed Oct. 29, 1997, now U.S. Pat. Ser. No. 5,904,960.

FIELD OF THE INVENTION

The invention relates generally to an apparatus for treating an article containing an oxidizable organic compound, and especially for treating a film that has been exposed to actinic radiation.

BACKGROUND OF THE INVENTION

It is well known that limiting the exposure of an oxygen sensitive product to oxygen maintains and enhances the quality and shelf life of the product. For instance, by limiting the oxygen exposure of an oxygen sensitive food product in a packaging system, the quality of the food product is maintained by minimizing nutrient loss, slowing enzymatic and lipolytic oxidation, preventing photolytic degradation, and reducing spoilage. In addition, such packaging also keeps the product in inventory longer, thereby reducing restocking costs, and costs incurred from waste.

One means for limiting the exposure of a product to oxygen involves incorporating an oxygen scavenger into the packaging structure itself. This achieves a more uniform scavenging effect throughout the package. This may be especially important where there is restricted air circulation inside the package. In addition, such incorporation can provide a means of intercepting and scavenging oxygen as it passes through the walls of the package (herein referred to as an "active oxygen barrier"), thereby maintaining the lowest possible oxygen level throughout the package.

Oxygen scavengers that can be incorporated into a film structure are disclosed in U.S. Pat. Nos. 5,310,497, 5,350,622 and 5,399,289 (Speer et al.), and a method of initiating oxygen scavenging generally is disclosed in U.S. Pat. No. 5,211,875 (Speer et al.). All of these four patents are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. The "oxygen scavenger" materials disclosed by Speer et al. are compounds which consume, deplete or reduce the amount of oxygen from a given environment.

Other oxygen scavengers which can be incorporated into a film structure are disclosed in PCT patent publication WO 94/12590 (Commonwealth Scientific and Industrial Research Organisation). These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

Oxygen scavengers are useful in MAP (modified atmosphere packaging) and barrier packaging environments. However, oxygen scavengers often require, or at least benefit from, triggering in order to activate the oxygen scavenging properties.

In copending U.S. patent application Ser. No. 08/691,829 filed Aug. 2, 1996, incorporated by reference herein in its entirety, an apparatus is disclosed which is beneficial in triggering oxygen scavenger films. This apparatus is especially useful when employed in a food processing plant or other facility where the triggering apparatus is located near a packaging machine. Thus disposed, an oxygen scavenger film can be triggered shortly before, and perhaps just a few seconds before, the film is used to package a food or other oxygen sensitive product.

Although these technologies offers great potential in packaging applications, it has been found that oxygen scavenger structures can sometimes generate reaction by-products which can adversely affect the taste and/or smell of the packaged material (i.e. organoleptic properties). These by-products can include acids, alcohols, alkenes, dienes, esters, aldehydes and ketones.

Technical solutions to this problem are disclosed in WO 97/32924 and WO 97/32925, both published Sep. 12, 1997 and both incorporated by reference herein in their entirety. These publications disclose various functional barrier materials suitable for use in multilayer oxygen scavenger films. These functional materials lower the amount of extractables, such as aldehydes, and the degree of undesirable organoleptic transfer, resulting from absorption of low molecular weight by-products of an oxygen scavenging reaction.

The inventors have found that although these technical solutions offer beneficial improvements in reducing extractables of organoleptic off-odors and off-flavors in oxygen scavenging films, still further improvement would be beneficial. It is now believed that in oxygen scavenger systems as described herein, the production of extractables is driven by two events.

The first event is the incidence of actinic radiation, e.g. ultraviolet light, onto the oxygen scavenger film, as occurs in the chamber of a triggering unit of the types described herein and in U.S. patent application Ser. No. 08/691,829. This procedure is known as "triggering" the film, leading to activation (usually within a short time) of the oxygen scavenger in the film. Unfortunately, this process is believed to also result in the photolytic degradation or breakdown of material in the film, e.g. at the film surface, and the production, as a by-product of this process, of organic materials such as aldehydes, ketones, etc.

The second event is the time at which the now triggered film actually activates, i.e. begins to scavenge oxygen. At this stage, the oxidizable organic compound present in the film or other article begins to oxidize, producing additional organic materials (aldehydes, ketones, etc.) as a by-product of the oxygen scavenging reaction.

The elapsed time between these two events is known as the induction time or induction period of the article.

In some cases, an article such as a film may not be exposed to actinic radiation, yet contain organic compounds which can adversely affect the organoleptic properties of a product to be contained in, or packaged with, the article.

The inventors have found that the benefits of lowered extractables and enhanced, i.e. improved, organoleptic properties can be obtained by treating an article at the same time as, and/or after, the article has been exposed to actinic radiation, e.g. UV light, preferably soon after this event, and more preferably during the induction period. The invention provides an effective method of and apparatus for lowering the amount of the extractables of a triggered article comprising an oxidizable organic compound, compared with a method and apparatus without the benefit of the invention.

The method and apparatus preferably provide that the article is treated prior to, and more preferably immediately prior to packaging of an oxygen sensitive product with the article.

Preferably, the invention provides a spatially compact-treating means.

Preferably, an apparatus is provided which is readily incorporated in-line into existing packaging systems.

In some cases, an oxygen scavenger article may not require exposure to actinic radiation in order to activate the scavenging functionality of the article. Nevertheless, organic products may be present, and/or generated by the oxygen scavenging process, and these products can sometimes adversely affect the organoleptic properties of a product to be contained in, or packaged with, the article. The invention can also be beneficial in lowering the amount of such organic compounds in such systems.

In still other cases, an article such as a film can contain organoleptic compounds as defined herein, even though the article does not contain an oxidizable organic compound. Here, too, the invention can be beneficially used to lower the amount of such organoleptic compounds in the article.

DEFINITIONS

"Film" herein means a film, laminate, sheet, web, coating, or the like which can be used to package a product.

"Amorphous silica" herein refers to silica that is free or substantially free of crystalline $SiO_2$ tetrahedra, as measured by x-ray diffraction.

"Oxidizable organic compound", "oxygen scavenger", and the like herein mean a composition, compound, article or the like which can consume, deplete or react with oxygen from a given environment.

"Actinic radiation" and the like herein means electromagnetic radiation, in any form such as ultraviolet radiation or visible light, capable of causing a chemical change, and is exemplified in U.S. Pat. No. 5,211,875 (Speer et al.).

"Polymer" and the like herein means a homopolymer, but also copolymers thereof, including bispolymers, terpolymers, etc.

"Organoleptic" herein refers to the perceived flavor and/or odor of a food or non-food product contained in a package made in accordance with the present method or apparatus.

"Organoleptic compound" refers herein to a compound, especially an organic compound, which can adversely affect the organoleptic properties of a food or non-food product contained in a package made in accordance with the present method or apparatus.

"Room temperature" herein is an ambient temperature from 20° C. to 25° C. (68° F. to 77° F.).

SUMMARY OF THE INVENTION

In a first aspect of the invention, a method comprises providing an article comprising an oxidizable organic compound and an organoleptic compound; advancing the article toward a means for treating the article, the means for treating the article comprising a treating medium, and a means for applying the treating medium to the article; and applying the treating medium to a surface of the article so as to lower the amount of the organoleptic compound in the article.

In a second aspect of the invention, an apparatus comprises a means for treating an article, the article comprising an oxidizable organic compound and an organoleptic compound, so as to lower the amount of the organoleptic compound in the article, the means for treating the article comprising a treating medium, and a means for applying the treating medium to a surface of the article; and a means for advancing the article toward the means for treating the article.

BRIEF DESCRIPTION OF THE DRAWINGS

A detailed description of preferred embodiments of the invention follows, with reference to the attached drawings, wherein.

DETAILED DESCRIPTION OF THE INVENTION

Figure 1:
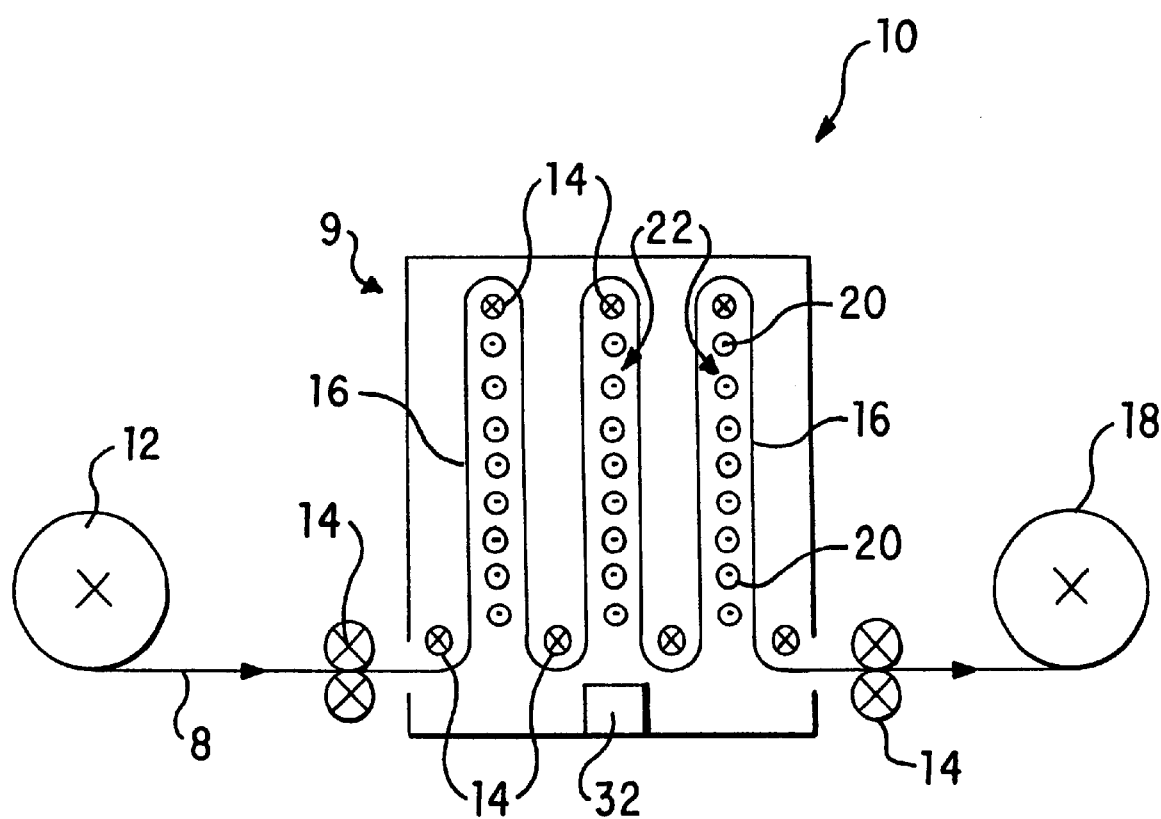
FIGS. 1 and 2 schematically illustrate an apparatus useful in connection with the present invention.

The invention can be used in connection with various articles of manufacture, compounds, compositions of matter, coatings, etc. Two preferred forms are sealing compounds, and flexible films, both useful in packaging of food and non-food products. In addition to caps and closures, and traditional flexible film applications, the invention can be used in association with semi rigid packaging, rigid containers, foamed and unfoamed trays, and paperboard liners, in systems where an oxygen scavenger has been triggered.

It is known to use sealing compounds in the manufacture of gaskets for the rigid container market. Large, wide diameter gaskets are typically made using a liquid plastisol. This plastisol is a highly viscous, liquid suspension of polymer particles in a plasticizer. In the manufacture of metal or plastic caps, lids, and the like, this liquid plastisol is applied to the annulus of a container such as a jar, and the container with the applied plastisol is "fluxed" in an oven to solidify the plastisol into a gasket. The result is a gasket formed around the annulus of the container.

Smaller gaskets are typically made for use in beer crowns in bottles. A polymer melt is applied by cold molding to the entire inner surface of the crown. Both poly(vinyl chloride) (PVC) and other polymers are used in this application.

Discs for plastic caps are typically made by taking a ribbon of gasket material and making discs, and inserting the discs into the plastic cap.

In these applications, when an article comprising an oxidizable organic compound has been triggered by exposure to actinic radiation, treating the article during and/or after triggering can beneficially lower the amount of organoleptic compounds in the article.

The invention can be used in the packaging of a wide variety of oxygen sensitive products including fresh red meat such as beef, pork, lamb, and veal, smoked and processed meats such as sliced turkey, pepperoni, ham and bologna, vegetable products such as tomato based products, other food products, including pasta and baby food, beverages such as beer, and products such as electronic components, pharmaceuticals, medical products, and the like. The invention is readily adaptable to various vertical form-fill-and-seal (VFFS) and horizontal form-fill-and-seal (HFFS) packaging lines.

Films suitable for use with the invention include an oxidizable organic compound, and preferably include both an oxidizable organic compound and a transition metal catalyst. Optionally, the oxygen scavenger film can also include photoinitiator compositions, antioxidants and other additives, for example as disclosed in U.S. Pat. No. 5,211,875. Preferred films contain an oxidizable organic compound of substituted or unsubstituted ethylenically unsaturated hydrocarbon polymer, preferably having a molecular weight of at least 1000. More preferably, the oxidizable organic compound is selected from the group consisting of styrene/butadiene copolymer, styrene/isoprene copolymer, polybutadiene, polyisoprene, or mixtures thereof.

The transition metal catalyst of the oxygen scavenger is preferably a transition metal salt of cobalt, manganese, or mixtures thereof. Other suitable transition metal catalysts are disclosed in U.S. Pat. No. 5,211,875.

The ethylenically unsaturated hydrocarbon and transition metal catalyst may be further combined with one or more polymeric diluents, such as thermoplastic polymers which are typically used to form film layers in plastic packaging products. In the manufacture of certain packaging products well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene(meth)acrylic acid ionomers. Blends of different diluents may also be used. The selection of the polymeric diluent depends in part on the product to be manufactured and the end use.

Exposing oxygen scavenger film to actinic radiation at a certain wavelength, intensity, residence time and distance from the film, results in a triggering of the oxygen scavenging properties of the film. UV-C light such as UV light of germicidal wavelengths has been found particularly effective at triggering oxygen scavenger films. Preferred wavelengths are between 200 nm and 280 nm, such as 254 nm.

As described in U.S. patent application Ser. No. 08/691,829, incorporated by reference herein in its entirety, oxygen scavenger films to be triggered are exposed to actinic radiation at the desired wavelength, at an intensity and residence time sufficient to provide the film with a dose of actinic radiation of at least 100 mJ/cm$^2$, preferably at least 200 mJ/cm$^2$, more preferably between 300 and 1600 mJ/cm$^2$, and most preferably between 400 and 800 mJ/cm$^2$. Within this range, different doses of actinic radiation, combined with an environment at a temperature of preferably at least 55° F., beneficially affect the scavenging rate of the film after triggering.

The intensity and residence time of actinic radiation may be utilized to provide the desired dose for a particular film. It is preferred to expose film to be triggered to actinic radiation at an intensity of at least 0.8 mW/cm$^2$, more preferably at least 2.0 mW/cm$^2$. In order to provide film paths which are not very long, film to be triggered is exposed more preferably to actinic radiation at an intensity of between 3.0 and 10 mW/cm$^2$, such as between 3.0 and 7.5 mW/cm$^2$. This intensity is provided at a distance from the source of actinic radiation to the film of preferably between 1 cm and 3 cm.

The desired dose of actinic radiation is provided to a particular film by traversing the film over a path having a particular length over which the film is exposed to the actinic radiation. At intensities as set forth above, oxygen scavenger film is usefully triggered over film paths preferably having a length between 0.5 m and 12 m, preferably 2 to 4 m and at average traveling speed of the film along the path of between 0.5 m/min and 30 m/min, typically 1.2 to 4 m/min. This procedure results in exposure times of the film to UV-C light of typically between 15 and 90 seconds. The above described wavelength, intensity and residence time of UV-C light have been found to trigger oxygen scavenger film to excellent oxygen scavenging rates, and with very small or negligible induction periods, thereby allowing the method of the present invention to be incorporated in-line to existing packaging methods so that oxygen scavenger film can be triggered at or shortly prior to packaging, and ameliorating problems related to storage and inventory of triggered oxygen scavenging films.

Oxygen scavenger films thus triggered exhibit oxygen scavenging rates, depending upon the formulation and type of package to which the film is applied, of between 1 cc/m$^2$/day and 100 cc/m$^2$/day at temperatures of 40° F. (4° C.) when measured 4 days after triggering. For modified atmosphere packages (MAP) having a modified atmosphere headspace, (MAP, 1–2% O$_2$), triggered oxygen scavenging film exhibits an oxygen scavenging rate of between 20 and 66 cc/m$^2$/day at 4° C. when measured 4 days after triggering.

FIG. 1 illustrates a free standing triggering unit 10 having an unwind roll 12 for feeding film 8 to chamber 9, a series of rollers 14 defining a film path 16 through chamber 9, and a windup roll 18 for receiving triggered film for subsequent use. Chamber 9 includes a source of actinic radiation, e.g. a series of low pressure germicidal wavelength UV bulbs 20 arranged in banks 22, with film path 16 being arranged to pass a film relative to banks 22 so as to expose the film to the desired dose of UV-C light.

The oxygen scavenger film can include a number of layers, with the oxidizable organic compound and transition metal catalyst layer preferably being arranged toward one side thereof. Multilayer oxygen scavenger films are described in U.S. Pat. No. 5,350,622. It is preferable to expose only the oxidizable organic compound and the transition metal catalyst side of the multilayer film to UV-C light. Further, it is preferred that any layers of the multilayer film that are between the source of UV-C light and the oxygen scavenger film be effectively transparent at 254 nm. Thus, as illustrated in FIG. 1, film path 16 can be arranged so as to expose only one side of film to banks 22 of bulbs 20, although optionally both sides of the film can be exposed to bulbs 20.

It is preferred to provide film path 16 at a distance from banks 22 of bulbs 20 of between 1 cm and 3 cm, such as 2 cm.

Figure 2:
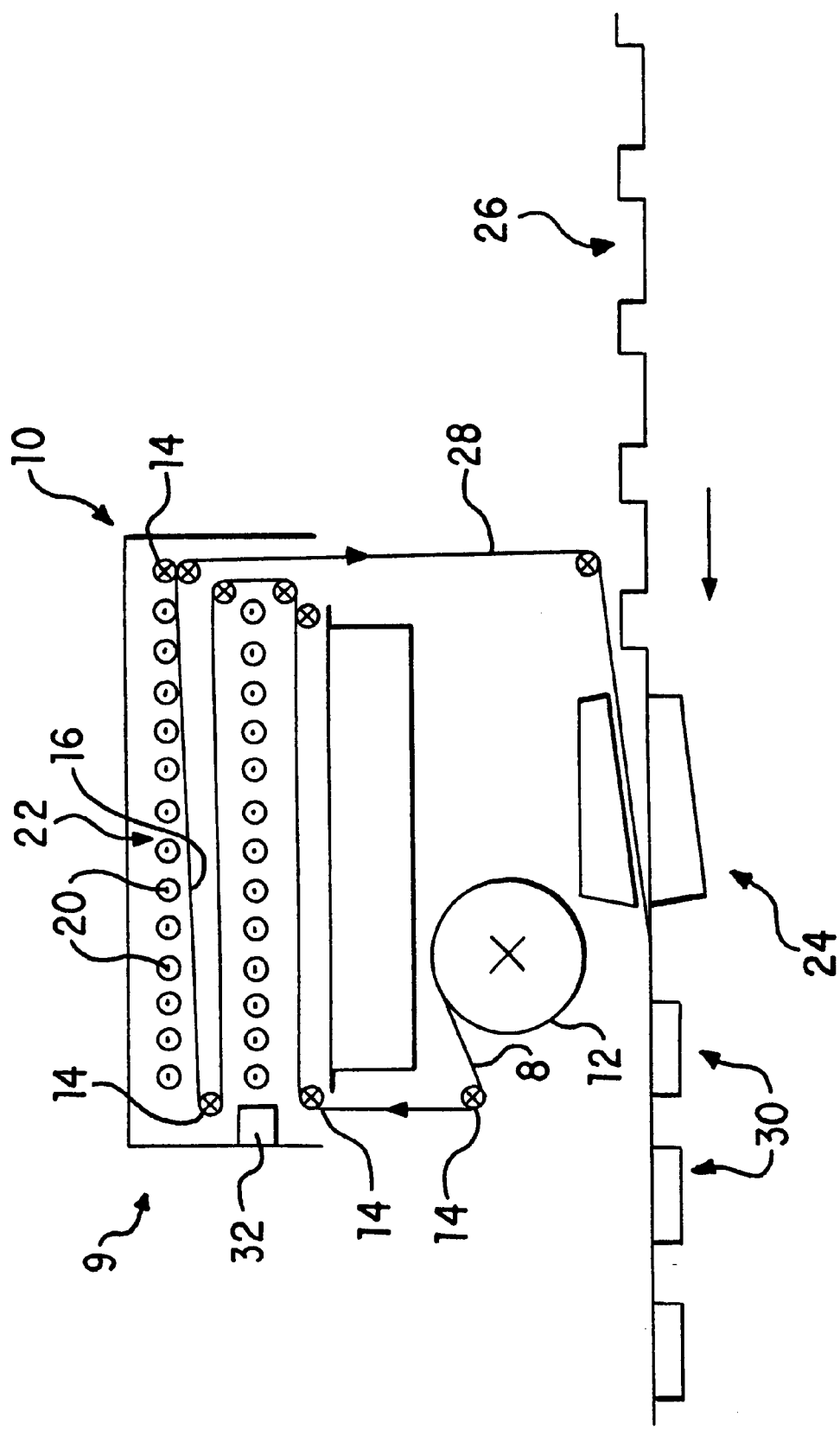

FIG. 2 illustrates an embodiment of triggering unit 10 wherein triggering unit 10 is incorporated in-line into a packaging apparatus. Chamber 9 is positioned so as to receive film 8 from unwind roll 12, pass film along film path 16 for exposure to a source of actinic radiation, e.g. UV-C light, and feed triggered film 28 directly to a packaging unit, for example, sealing/gas flush dies 24. Triggered film 28 is immediately incorporated as a layer into packages along with formed web 26 supplied from other elements of the packaging assembly. Sealing/gas flush dies 24 serve to apply triggered film 28 to formed web 26 so as to provide packages 30 including triggered film.

Optionally, triggering unit 10 can be provided with a sensor unit 32 for monitoring the dose of UV-C light emitted by bulbs 20. This allows detection of deteriorating or malfunctioning bulbs 20. Sensor unit 32 can be, for example, an Online UV Intensity Display Module (EIT, Inc., Sterling, Va) having 250–260 nm Standard UVI Sensors. Sensor unit 32 can be interlocked or operatively associated with a controller for the packaging line so that packaging can be automatically interrupted if UV-C light output is insufficient.

Bulbs 20 are preferably shielded to an effective intensity or irradiance E of less than or equal to 0.1 mW/cm$^2$, and are preferably provided with a sleeve member (not shown) for protecting the film in the film path 16 against contact with broken elements such as glass, etc., of a bulb 20, should bulb 20 break. The sleeve can be a shrinkable member or coating to be applied to bulbs 20. The preferred sleeve is a heat-shrunk FEP-Teflon® sleeve.

Bulbs 20 can be fluorescent tube-type bulbs, which preferably have a width sufficient to extend beyond either side of the width of a film to be treated. Bulbs have a width of preferably between 36 and 48 inches, which may be suitable for treating films having a width of up to 30 to 40 inches.

Figure 3:
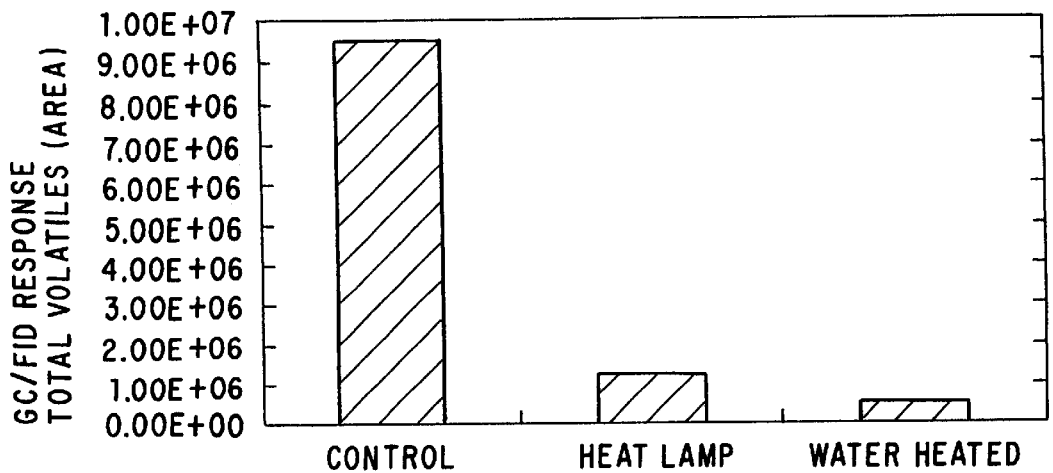
FIGS. 3 and 4 graphically illustrate the reduction of odor causing volatiles in accordance with the invention.
Figure 4:
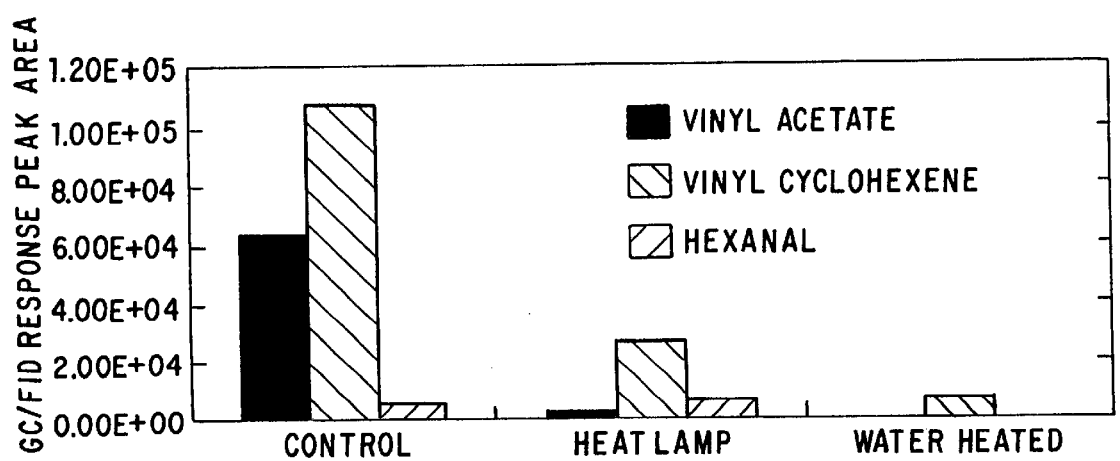

FIGS. 3 and 4 represent the results of a test involving a monolayer film triggered, and then either untreated, treated with a heat lamp, or treated with heated water.

FIG. 3 illustrates a chart in which three bars appear. The bar to the left represents a control film that was triggered as described herein, without further post-trigger treatment. Table 1 identifies the materials used in the monolayer film, and in the multilayer laminates also described herein.

TABLE 1

| MATERIAL | TRADENAME | SOURCE | DESCRIPTION |
|---|---|---|---|
| $PE_1$ | Exact ™ 4150 | Exxon | metallocene catalyzed PE, an ethylene/1-hexene co-polymer with a density of 0.895 gm/cc |
| $PE_2$ | | | low density polyethylene |
| $A_1$ | Sylobloc ™ 45 | Grace Davison | amorphous silica |
| $PEC_1$ | Escorene ™ PD9302.E1 | Exxon | propylene/ethylene co-polymer with 3.3% ethylene comonomer |
| $EM_1$ | SP2260 | Chevron | ethylene/methyl acrylate copolymer with 24% methyl acrylate comonomer |
| $EV_1$ | Escorene ™ LD 318.92 | Exxon | ethylene/vinyl acetate co-polymer with 9% vinyl acetate comonomer |
| $EV_2$ | PE 1375 | Rexene | ethylene/vinyl acetate co-polymer with 3.6 wt. % vinyl acetate comonomer |
| $EV_3$ | TD 3401-70 | Chevron | ethylene/vinyl acetate co-polymer |
| $OS_1$ | Vector 8508-D | Dexco | styrene/butadiene copolymer |
| $CAT_1$ | | Shepherd | cobalt oleate (a transition metal catalyst) |
| $PI_1$ | benzoylated 1,3,5-triphenylbenzene | Aldrich | photoinitiator |
| $AD_1$ | Adcote ™ 530 and Coreactant 9L23 | Morton International | mixture of silane, isocyanate, glycol, and alkyl acetate |
| $F_1$ | 50 m-44 Mylar ™ | DuPont | saran-coated polyethylene terephthalate film |

Suitable bulbs are sold by Voltarc under part designation UV-LUX GRFX5194.

The step of exposing oxygen scavenger film to actinic radiation can optionally be carried out in a stepwise procedure wherein the film is exposed in a plurality of discrete periods of time. This embodiment is readily adaptable to packaging machines which operate with intermittent motion such as MULTIVAC™ R7000 thermoforming machine distributed by KOCH of Kansas City, Mo.

In accordance with the present invention, it has now been found that many of the organoleptic compounds (typically organic volatiles) present in an oxygen scavenger article either before or after activation of an oxidizable organic compound in the article, and/or occurring as by-products in oxygen scavenging triggered systems, can be lowered to sub-threshold levels, i.e. to levels below the concentration of a compound needed to activate taste receptors, by treating the article as disclosed herein, e.g. during and/or after triggering. GC/ MS (gas chromatography/mass spectrometry) data showed that the amount of certain volatile compounds was lowered when exposing the film to hot water, steam, direct heat, and forced hot air.

Certain materials were blended together for the laminate structures, and these blends had the following formulations:
$AB_1$=80% $PE_1$+20% (95% $PE_2$+5% $A_1$).
$AB_2$=60% $PE_1$+40% (95% $PE_2$+5% $A_1$).
$PECB_1$=50% $PEC_1$+50% $EM_1$.
$OSB_1$=50% $EV_1$+40% $OS_1$+10% (88% $EV_3$+11.0% $CAT_1$+1.0% $PI_1$).
$EVB_1$=80% $EV_2$+20% (95% $PE_2$+5% $A_1$).

The film was a monolayer film having a blend of 40% $OS_1$, 0.1% cobalt from $CAT_1$, and 0.1% $PI_1$, the remainder being $EV_1$.

The second bar, in the center of the graph, represents a film of the same composition as the control, but in which, immediately after triggering, the film was exposed to a heat lamp such that the air immediately adjacent the exposed film surface was raised to a temperature of about 77° C. for three minutes.

The third bar represents a film compositionally like the first film, but in which, immediately after triggering, the film was immersed in water having a temperature of 80° C., for 5 minutes.

FIG. 4 illustrates the analytical results obtained by analyzing the film with respect to specific odor causing volatiles.

The three bars grouped to the left end of the chart represent control samples in which no treatment was done. Of the three bars, the leftmost solid bar represents vinyl acetate, the middle striped bar represents vinyl cyclohexene, and the rightmost crosshatched bar represents hexanal.

The middle three bars in the chart represent a film of the same composition as the control, but in which, immediately after triggering, the film was exposed to a heat lamp such that the air immediately adjacent the exposed film surface was raised to a temperature of about 77° C. for three minutes. Of the three bars, the leftmost bar of this middle group represents vinyl acetate; the middle bar, vinyl cyclohexene; and the rightmost bar, hexanal.

The bar to the right end of the chart represents a film compositionally like the first film, but in which, immediately after triggering, the film was immersed in 80° C. water for 5 minutes. With the methodology used, no peaks were detected for the vinyl acetate and the hexanal, so the only bar appearing in this portion of the chart represents the detected amount of vinyl cylcohexene.

In each case for the data of FIGS. 3 and 4, the film was analyzed and data generated by GC/FID (flame ionization detector) curves by direct desorption immediately after triggering.

FIG. 3 shows a significant reduction in the amount of the total volatiles, i.e., flavor and non-flavor producing compounds, when film was exposed to radiant heat or direct heat after UV triggering.

Similarly, FIG. 4 demonstrates a significant reduction in the amount of selected flavor-causing compounds, i.e. vinyl acetate, vinyl cyclohexene, and hexanal.

The degree to which the reduction of these and other compounds affects the organoleptics of the film was not assessed through the analytical methods just mentioned.

Therefore, further work was done to test the effect of post-trigger treatment on the organoleptics of oxygen scavenging films.

A laminate was prepared for this purpose.

The laminate was made by laminating a coextruded four-layer film, using a conventional adhesive, to a second film. The structure of the laminate was:

$AB_1/PECB_1/OSB_1/EVB_1//AD_1//F_1$

The target (and approximate actual) gauge (in mils) of each layer of the laminate structure is shown in Table 2.

TABLE 2

| layer 1 (AB$_1$) | layer 2 (PECB$_1$) | layer 3 (OSB$_1$) | layer 4 (EVB$_1$) | adhesive (AD$_1$) | layer 5 (F$_1$) |
|---|---|---|---|---|---|
| 0.15 | 0.15 | 0.50 | 1.20 | (minimal) | 0.75 |

Figure 5:
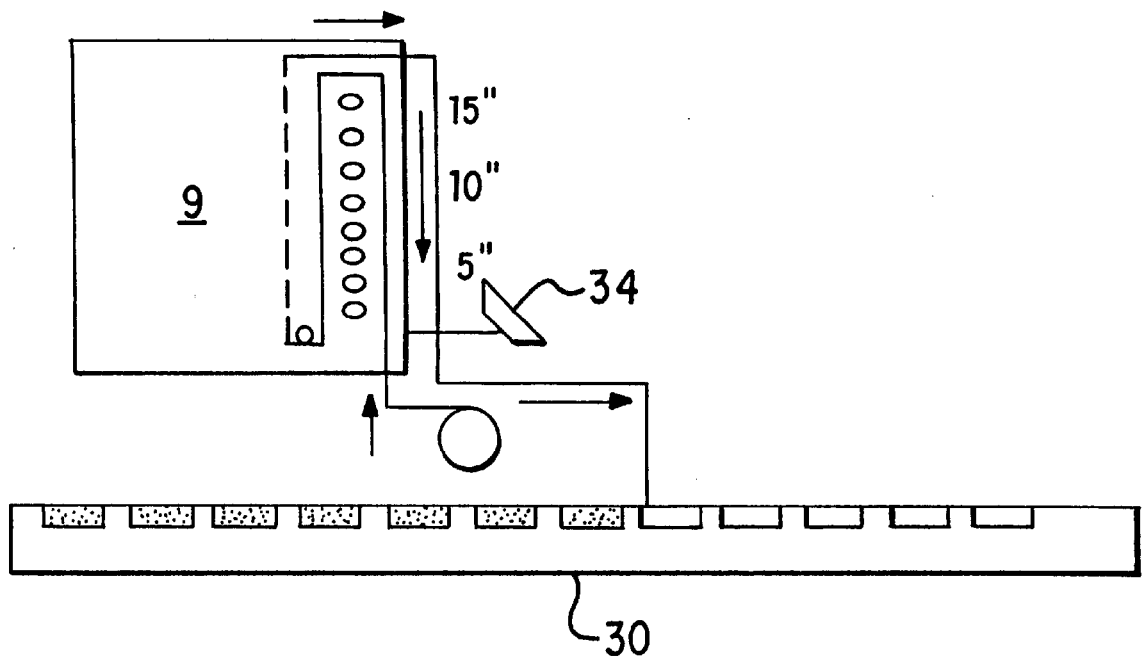
FIGS. 5 and 6 schematically illustrate a method and apparatus in accordance with the present invention.

A heated air knife 34 (LEISTER LE 5000 Electric Hot Air Tool) attached to a blower (GAST Standard Regenair Blower) was adapted to the triggering unit described herein. The knife was positioned, at its nearest point, about 3 inches from the film. The temperature of the heated air at the surface of the film was measured at three points: at about 5", 10" and 15" away from the knife (FIG. 5). The knife angle was set at approximately 45 degrees to the film path. A Multivac R7000 intermittent motion packaging machine 30 was run at 4 cycles per minute, i.e., the film remained stationary for about 13 seconds at a given point in space. The heated air knife was able to maintain the surface temperature fairly constant throughout the film regardless of the distance. The air temperature was mainly dependent on the air knife temperature meter and the air flow valve settings.

Two sets of experiments were conducted. For both tests, a film having an oxidizable organic compound was triggered within a chamber as described herein with approximately 800 mJ/cm$^2$. The triggered film was then advanced from the chamber and past the hot air knife/blower combination.

For the first experiment, the blower and the air knife were adjusted so that the air immediately adjacent the surface of the film reached a maximum temperature of 110° F. Packages containing 200 mL of water then made with this film, and gas flushed with 0.5% $O_2$:99.5% $N_2$, to simulate field testing conditions.

For the second experiment, the maximum temperature reached next to the surface of the film was 200° F., and then packages containing 200 mL were made, and gas flushed with 1% $O_2$:99% $N_2$.

Samples were stored at 40° F. and evaluated at 18 hours, and at seven days after triggering. Samples were submitted to sensory evaluation for a Tri-angle test with open comments.

Sensory results showed a significant improvement (P<0.001) in the organoleptics of the film. For both oxygen residual levels, 0.5% and 1.0%, the improved organoleptics was not only evident in packages tested 18 hours after triggering, but even for packages that were tested after one week, i.e., film had scavenged for seven days. In both cases, panelists indicated through open-ended comments that the "heated film" had no-off flavor to less off flavor when compared to controls.

Improvements in organoleptic properties were further confirmed by analytical testing. Table 4 contains GCO (Gas Chromatography Olfactometry) and GC/MS data concerning odor active compounds associated with some oxygen scavenger films. The laminate structure in this study was similar to the multilayer laminate described earlier herein, and had the structure:

$AB_2/PECB_1/OSB_1/EVB_1//AD_1/F_1$

The target (and approximate actual) gauge (in mils) of each layer of the laminate structure is shown in Table 3.

TABLE 3

| layer 1 (AB$_2$) | layer 2 (PECB$_1$) | layer 3 (OSB$_1$) | layer 4 (EVB$_1$) | adhesive (AD$_1$) | layer 5 (F$_1$) |
|---|---|---|---|---|---|
| 0.15 | 0.15 | 0.50 | 2.20 | (minimal) | 0.48 |

The data compares volatiles (odor active species) before and after treatment with a hot-air knife.

TABLE 4

Relative Areas and Odor Characteristics of
Organoleptic Compounds,
with and without Hot Air Knife Technique
Triggered @ 800 mJ/cm$^2$; P&T 45° C./30 min. W/Tenax Trap;
Thermally Desorbed @ 40° C.–250° C.)

| | Volatiles | | Relative Area Counts (GC-MS) | | | |
|---|---|---|---|---|---|---|
| Odor Description/ GCO | ID by GC-MS & GCO | GCO Retention Time, min. | Without Air Knife Day 1 15 Hours after triggering | With Air Knife Day 1 15 Hours after triggering | Without Air Knife Day 7 (464 ppm residual O$_2$) | With Air Knife Day 7 (480 ppm residual O$_2$) |
| sweet | unknown | 4 to 5 | detected | N/D | N/D | N/D |
| alcohol-like | acetaldehyde | 5.8 | 176,930 | 109,718 | 168,215 | N/D |
| slight green; fast | unknown | 7.0 | 54,425 | N/D | N/D | N/D |
| very mild green | propanal | 10.1 | VL | VL | N/D | N/D |
| dusty | 3-methyl-1,4-pentadiene | 10.3 | 49,976 | N/D | N/D | N/D |
| sweet | 2-methyl-2-propanol | 12.5 | 27,849 | 32,964 | 28,648 | 13,285 |
| sweet turning into musty | 1-hexene | 13.6 | 9,192 | N/D | 8,483 | N/D |
| gas-like smell | 2,2-dimethyl propanal | 14.6 | 10,604 | N/D | N/D | N/D |
| sweet but pungent | 2-methyl-1-pentene | 15.0 | 13,244 | N/D | 31,632 | N/D |
| more pungent | butanal | 15.1 | N/D | N/D | 585,250 | N/D |
| sour; acidic | acetic acid | 17.5 | 1,670,338 | N/D | N/D | N/D |
| lop burnt; very mild | pentanal | 19.0 | VL | VL | VL | VL |
| nasty; burnt wire strong gas | 2-ethenyl-2-butenal | 19.2 | VL | VL | VL | VL |
| pungent gas | C8H18O (similar to 2,2,4-trimethyl pentanol) | 20.2 | N/D | N/D | 2,948 | 2,845 |
| sweet | 2,3-dimethyl-2-hexene | 21.2 | N/D | N/D | 543,141 | 167,562 |
| nasty; burnt LOP; gas smell | 2-hexen-1-ol | 21.5 | N/D | N/D | 10,542 | N/D |
| sweet to sweeter | 2,4-heptanedione | 21.8 | N/D | N/D | 17,210 | 5,939 |
| green grass | hexanal | 21.9 | VL | VL | VL | VL |
| bad; nauseating; very strong | vinyl cyclohexene | 22.4 | 77,617 | 32,329 | 59,626 | 33,652 |
| soapy; nasty | C7H10O2 (similar to 2-hydroxy-3,5-dimethyl cyclopent-2-en-1-one) | 22.6 | 40,863 | 100,031 | 897,969 | 104,337 |
| sweet | 2-methyl cyclobutanone | 23.0 | 108,480 | 91,901 | 72,114 | 93,773 |
| sweet | ethyl benzene | 23.1 | 145,987 | 130,928 | 207,093 | 109,389 |
| sweet | 1,3-dimethyl benzene | 23.2 | 76,950 | 74,152 | 76,331 | 77,169 |
| nasty; feet smell | C6H12O (similar to 4-hexen-1-ol) | 23.4 | 23,145 | VL | 17,147 | 15,077 |
| musty water | 1,4-dimethyl benzene | 23.6 | 27,434 | N/D | N/D | N/D |
| sweet like contact glue | 6-methyl-1-hexanol | 23.8 | VL | VL | VL | VL |
| sweet | 3-heptanol | 24.0 | 90,999 | 33,932 | 78,509 | 36,214 |

TABLE 4-continued

Relative Areas and Odor Characteristics of
Organoleptic Compounds,
with and without Hot Air Knife Technique
Triggered @ 800 mJ/cm$^2$; P&T 45° C./30 min. W/Tenax Trap;
Thermally Desorbed @ 40° C.–250° C.)

| | | | Relative Area Counts (GC-MS) | | | |
|---|---|---|---|---|---|---|
| Odor Description/ GCO | ID by GC-MS & GCO | GCO Retention Time, min. | Without Air Knife Day 1 15 Hours after triggering | With Air Knife Day 1 15 Hours after triggering | Without Air Knife Day 7 (464 ppm residual O$_2$) | With Air Knife Day 7 (480 ppm residual O$_2$) |
| solvent gas | 1-decanol | 24.1 | N/D | N/D | 70,751 | N/D |
| nasty; soapy; cheesy | 2,6,6-trimethyl-2-cyclohexen-1-ol | 24.5 | 52,531 | 90,279 | 94,462 | 94,377 |
| nasty; soapy; cheesy | 2,4-dimethyl-2,4-heptadienal | 25.0 | 52,039 | 37,183 | 27,621 | 27,126 |
| earthy; wet soil | benzaldehyde | 25.9 | 178,419 | 226,305 | 364,041 | 320,207 |
| legume; earthy | octanal | 26.1 | 244,865 | N/D | N/D | N/D |
| citrus orange | d-limonene | 26.4 | 1,216,926 | 74,919 | 88,031 | 81,356 |
| cheap soap | 1-tridecanol | 27.4 | 514,888 | 267,610 | 249,947 | 190,687 |
| cucumber; legume | 2-decanone | 29,0 | 45,855 | 143,913 | 86,303 | 105,167 |
| cucumber; legume | 1-tetradecanol | 29.6 | 26,682 | N/D | 12,546 | 6,542 |
| Total Area Counts | | | 4,936,238 | 1,446,164 | 4,120,620 | 1,484,704 |

With respect to Table 4, note that:

Initial O$_2$ concentrations of all specimens at Day 0 ranged from 1.2 weight % to 1.4 weight %.

Approximately 30 compounds were identified in the untreated sample (Day 1, 15 hours post triggered). For the same sample with the air-knife, only 20 odorants were detected. Nine were not detected.

After 7 days of scavenging oxygen, 28 odor active compounds were identified in the untreated sample. For the same sample with the air-knife, 22 odorants were identified. Of those 22 odorants, 16 were at a lower concentration for the treated (air-knife) sample. This is very significant and explains why the taste panel preferred the water in the treated sample.

N/D=Not Detected

VL=Area counts Very Low

Volatiles not detected by GCO were not included in this data set. They were mostly alkanes and are not associated with odor or taste problems.

Area Counts are relative, however, they are expected to be proportional to concentration for a given odorant. Even for relative concentrations, areas of one odorant cannot be directly compared to a different odorant.

The overall effect of the treatment on all the odorants is generally more important than the effect on any one particular odorant. The total areas at the bottom of Table 4 demonstrate a dramatic drop in total area, both at day 1 and day 7, when the laminate was treated in accordance with the invention.

For data involving the use of the hot air knife, the temperature of the air at the surface of the film closest to the hot air knife was 180° F.

Furthermore, scavenging data (Tables 5 and 6) indicates that heating the film immediately after triggering enhances initial scavenging rates, allowing the film to reach maximum peak rates at 24 hours or less. According to these experiments, average rates of heated films at day 1 were three time higher than the controls. The same holds true for the average oxygen scavenging capacity. This is significant because, even though the heated film had scavenged more oxygen than the controls by day 1, it was still perceived as having better organoleptics than the non-heated controls. After day 2, average rates of treated samples and control were approximately equivalent, because control samples achieved their maximum instantaneous rates by day 2 or 3. In both cases, treated and non-treated film, the final average capacities were basically the same, yet the heated film was perceived as being organoleptically better. Measurements for Tables 5 and 6 were taken at 40° F.

TABLE 5

Scavenging Performance of oxygen scavenger film heated after triggering

| Treatment | Average Rate at day 1 (cc/m²*day) | | Average Rate at day 7[a] (cc/m²*day) | | Average Capacity at day 1 (cc $O_2$/m²/mil) | | Average Capacity (see footnote) (cc $O_2$/m²/mil) | |
|---|---|---|---|---|---|---|---|---|
| | Mean | St. Dev. | Mean | St. Dev. | Mean | St. Dev. | Mean | Std. Dev. |
| Control, 0.5% $O_2$ | 15.7 | 3.9 | 26.1 | 0.5 | 23.2 | 5.8 | 366.1[a] | 6.9 |
| air knife 145° F. 0.5% $O_2$ | 40.0 | 1.4 | 25.9 | 1.4 | 59.2 | 2.1 | 363.3[a] | 19.5 |
| Control 1.0% $O_2$ | 32.4 | 3.0 | 73.4 | 0.8 | 62.9 | 5.8 | 693.3[b] | 7.5 |
| air knife 200° F. 1.0% $O_2$ | 101.8 | 10.5 | 67.1 | 0.3 | 197.9 | 20.4 | 634.2[b] | 3.1 |

[a]Data for packages flushed with 0.5% $O_2$ are for day 7.
[b]Data for packages flushed with 1% $O_2$ are for day 5.

TABLE 6

Scavenging Performance of oxygen scavenger film heated after triggering

| Treatment | Peak Instantaneous Rate (cc/m²*day) | |
|---|---|---|
| | Mean[a] | Standard Deviation |
| Control, 0.5% $O_2$ | 40.0 (2) | 1.4 |
| air knife, 145° F., 0.5% $O_2$ | 42.6(<1) | 7.6 |
| Control, 1.0% $O_2$ | 103.5 (2) | 8.1 |
| air knife, 200° F., 1.0% $O_2$ | 131.2 (1) | 4.3 |

Thus, the use of heat imparted by a moving stream of air immediately after triggering oxygen scavenging film resulted in significant improvement in the organoleptics of the film.

As an added benefit, heating the film significantly enhanced initial scavenging rates.

The data of Tables 5 and 6 is also significant in that it is important to remove oxygen from the interior environment of the package as soon as possible after packaging. The enhanced rate and capacity at day 1 results in the reduction of the oxygen content of the package interior more quickly than in the control, thus further enhancing the utility of the invention.

Figure 6:
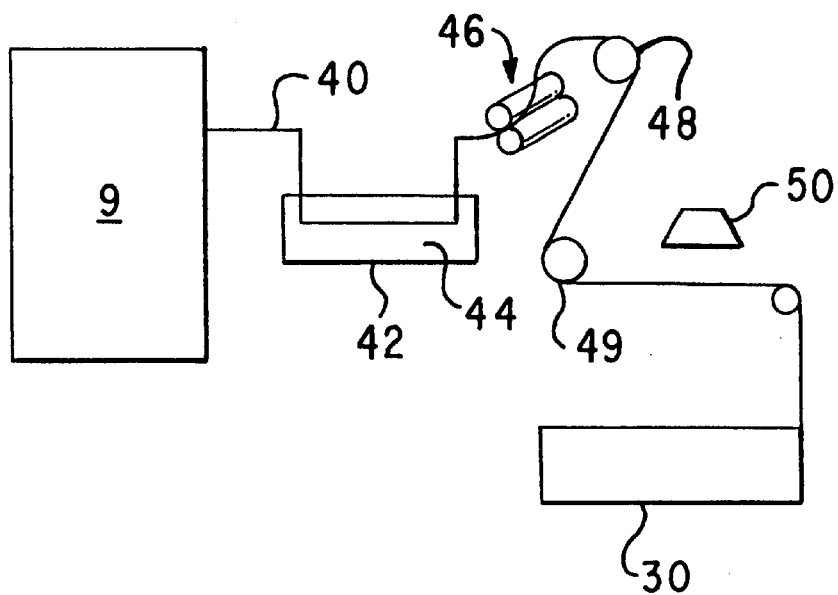

In an alternative embodiment (see FIG. 6), an oxygen scavenging film passes from a triggering chamber generally designated as 9; the film advances out of chamber 9 along a film path 40, and through a water or chemical bath 42 containing a material 44. The treating medium 44 can be any suitable solid or liquid that, when contacted on a surface of the triggered film, will take up, absorb, adsorb, sequester, dissolve, drive off, or otherwise lower the amount of organic, low molecular weight extractables on or in the film. Examples of material 44 include liquids such as water and hydrogen peroxide solution; and solids such as hydrous silicates (e.g. vermiculite), amorphous silica, zeolite, hydrotalcite, and activated carbon. Preferably, material 44 is heated water; more preferably water having a temperature of between 71° F. and 212° F., such as between 100° F. and 200° F., and most preferably between 140° F. and 180° F. Circulation or agitation of the treating medium, as well as constant replacement to keep extractable concentrations at a low level, can further improve the removal of low molecular weight extractables.

When using bath 42, it is preferable to draw the film through the bath and then run the film through squeeze rollers 46 to remove excess fluid or solid from the film surface. The film can be further dried if necessary by passing the film through heated rollers 48,49, and/or by passing the film past air blower 50. An alternative is the use of a doctor blade or other mechanical device to remove any excess material 44. Still another alternative is the use of a vacuum chamber.

When using the hot air knife 34, the air is preferably at a temperature of between 140° F. and 180° F. Other heated gases, e.g., nitrogen, can also be used.

At the package line 30, the triggered and treated film is used to package an oxygen sensitive product, and the finished package is then advanced to a conveyor or other appropriate means for further processing.

Packaging systems are generally well known in the art, and need no further description herein. The present invention can be employed in association with any suitable packaging system.

Alternatively, after the article has been treated, it can be stored (in the case of film, by rewinding the film) in a suitable environment for later use. However, the oxygen scavenging capacity of the article will typically decrease with time as the oxygen scavenger activates and begins to scavenge oxygen.

A means for heating (not shown) can optionally be used to raise the temperature of chamber 9 to at least 55° F. during the time that the film 8 is being triggered within the chamber. The means for heating can be any suitable means, including, by way of example, a consumer or commercial heated blower or heat gun, an infrared heater, a temperature-controlled cartridge heater with a suitable air circulation system; an enclosed hot water circulation system that exchanges heat with the chamber interior atmosphere; or any other suitable heating means.

The means for treating, whether solid, liquid, or gas, is preferably heated, but some improvement in organoleptics can be obtained even at lower temperatures, e.g. at room temperature, due to the flushing nature of the fluid contact (gas or liquid, or solid in pulverulent form) to carry away extractables from the surface. In the case of the use of liquids as the treating medium, it is theorized that benefits can be attributed to solvation of the extractables in the treating medium.

In some cases, treatment can be beneficially carried out at temperatures even lower than room temperature, such as 50° F., 40° F., and as low as 32° F., depending on the nature of the treating medium.

The invention is not limited to the illustrations described herein, which are deemed to be merely illustrative, and susceptible of modification of form, size, arrangement of parts and details of operation.

For example, although the invention is described in its preferred embodiments as a film which is treated on a major surface thereof, the film can be treated along any and all surfaces thereof. For example, the film can be treated on both of its major surfaces. This can be accomplished by any suitable means, such as repeating the treating process step after a first pass, while rotating the film to expose the untreated surface. Alternatively, a pair of hot air knives can be used to simultaneously treat both major surfaces of the film. Any combination of the means for treating disclosed herein can be used. If the film is in tubular form, it can be treated on the outside of the tube, the inside of the tube, or both. Of course, in the case of immersion of the article in a liquid bath, the entire outside surface of the triggered article will be treated.

The means for advancing the article, such as a film, out of the chamber, towards the means for treating, and if desired towards the means for removing excess treating medium, can be of any suitable type, including endless belts, driven or idler rollers, nip rolls, and the like. Since the invention will typically be used in connection with a packaging machine, the packaging machine itself can in some cases be considered as the means for advancing the article toward a treating means, and/or as the means for advancing the article toward a means for removing treating medium from the surface of a treated article.

Although the invention is described as useful in cooperation with intermittent motion packaging machines, it can also be used beneficially with continuous motion machines. Thus, residence time for the film, i.e. the time the film is exposed to the treating medium, can vary greatly from one packaging system to another, and can be from one second or less, to 3 to 4 seconds, to 20 seconds or more. The velocity, temperature, and other parameters of the treatment can be suitably adjusted to account for this variation.

Those skilled in the art, after reviewing the present invention, will find, through routine experimentation, optimal treatment conditions depending on several factors, including the particular treating medium employed; the chemical composition, structural arrangement, and morphology of the article (film, gasket, etc.) being treated; the conditions under which the article is exposed to actinic radiation; the temperature at which the treatment process is conducted; the velocity of the article as it is passed by or through the means for treating; the velocity of the treating medium; the target level of extractables in the final article; the type of product being packaged; etc. As an example, gaskets of the type disclosed herein can be optimally treated in a heated liquid medium because of greater temperature resistance than typical packaging films.

Those of skill in the art will appreciate that articles such as films have a limited capability to undergo heat, fluid, or other treatments without a significant degradation of the physical properties or performance of the film. When a solid material is the treatment medium, the triggered article can be advanced through a mass of the material, the mass kept at temperatures of preferably between 32° F. and 300° F. Alternatively, the film or other article can be advanced between rollers containing or carrying a treating material. Temperatures below and above this temperature range can in some cases be effective in reducing organoleptic compounds of the triggering step, but at higher temperatures, the risk of damage to the film, or degradation of film properties, increases. The same is true for higher temperature fluids (gases and liquids.)

It will also be understood that treatments at higher temperatures may require shorter treatment times to effect an equivalent degree of improvement in levels of organic extractables.

The article to be treated should not be physically degraded, nor have its performance characteristics degraded, to any substantial extent as a result of the treating process. An example would be a treatment that rendered the treated article unfit for its intended commercial use. Thus, as a general rule, chemical or physical agents that would cause such degradation will not be suitable for use in connection with the present invention. However, the nature and degree of the degradation, and the intended end use, will determine the suitable of the treatment. For example, a substantial degradation of optical properties (haze, gloss, clarity) in a transparent flexible film can be nevertheless tolerable if the treated material will be laminated to a metal foil such that the loss in optical properties is of no commercial significance.

Any combination of treatments can be used. An example is a liquid bath followed by heated air. In this case, the heated air can be used to dry the excess liquid from the article surface, and also further treat the article.

What is claimed is:

1. An apparatus comprising:
   a) a means for treating an article, the article comprising an oxidizable organic compound and an organoleptic compound, so as to lower the amount of the organoleptic compound in the article, the means for treating the article comprising
      i) a treating medium, and
      ii) a means for applying the treating medium to a surface of the article; and
   b) a means for advancing the article toward the means for treating the article, wherein the treating medium comprises a gas having a temperature, at the surface of the article, of between 32° F. and 300° F., the gas selected from the group consisting of air, nitrogen, and steam.

2. The apparatus of claim 1 comprising
   a) a means for emitting actinic radiation; and
   b) a means for advancing the article toward the means for emitting actinic radiation, in order to provide a triggered article.

3. The apparatus of claim 2 comprising a chamber within which the means for emitting actinic radiation is disposed.

4. The apparatus of claim 2 comprising a means for emitting ultraviolet light.

5. An apparatus comprising:
   a) a means for treating an article, the article comprising an oxidizable organic compound and an organoleptic compound, so as to lower the amount of the organoleptic compound in the article, the means for treating the article comprising
      i) a treating medium, and
      ii) a means for applying the treating medium to a surface of the article; and
   b) a means for advancing the article toward the means for treating the article, wherein the treating medium comprises a liquid having a temperature, at the surface of the article, of between 32° F. and 212° F., the liquid selected from the group consisting of water and hydrogen peroxide solution.

6. The apparatus of claim 5 comprising
a) a means for emitting actinic radiation; and
b) a means for advancing the article toward the means for emitting actinic radiation, in order to provide a triggered article.

7. The apparatus of claim 6 comprising a chamber within which the means for emitting actinic radiation is disposed.

8. The apparatus of claim 6 comprising a means for emitting ultraviolet light.

9. An apparatus comprising:
a) a means for treating an article, the article comprising an oxidizable organic compound and an organoleptic compound, so as to lower the amount of the organoleptic compound in the article, the means for treating the article comprising
   i) a treating medium, and
   ii) a means for applying the treating medium to a surface of the article; and
b) a means for advancing the article toward the means for treating the article, wherein the treating medium comprises a solid having a temperature, at the surface of the article, of between 32° F. and 300° F., the solid selected from the group consisting of hydrous silicate, amorphous silica, zeolite, hydrotalcite, and activated carbon.

10. The apparatus of claim 9 comprising
a) a means for emitting actinic radiation; and
b) a means for advancing the article toward the means for emitting actinic radiation, in order to provide a triggered article.

11. The apparatus of claim 10 comprising a chamber within which the means for emitting actinic radiation is disposed.

12. The apparatus of claim 10 comprising a means for emitting ultraviolet light.

13. An apparatus comprising:
a) a means for treating an article, the article comprising an oxidizable organic compound and an organoleptic compound, so as to lower the amount of the organoleptic compound in the article, the means for treating the article comprising
   i) a treating medium, and
   ii) a means for applying the treating medium to a surface of the article; and
b) a means for advancing the article toward the means for treating the article, wherein the means for treating the article comprises a pair of rollers between which the article is advanced, the rollers having a temperature of between 32° F. and 300° F.

14. The apparatus of claim 13 comprising
a) a means for emitting actinic radiation; and
b) a means for advancing the article toward the means for emitting actinic radiation, in order to provide a triggered article.

15. The apparatus of claim 14 comprising a chamber within which the means for emitting actinic radiation is disposed.

16. The apparatus of claim 14 comprising a means for emitting ultraviolet light.

17. An apparatus comprising:
a) a means for treating an article, the article comprising an oxidizable organic compound and an organoleptic compound, so as to lower the amount of the organoleptic compound in the article, the means for treating the article comprising
   i) a treating medium, and
   ii) a means for applying the treating medium to a surface of the article; and
b) a means for advancing the article toward the means for treating the article, wherein the means for applying the treating medium to a surface of the article is selected from the group consisting of
   i) a container within which the treating medium is disposed;
   ii) a blower capable of directing a fluid toward the surface of the article;
   iii) a pair of rollers; and
   iv) a lamp.

18. The apparatus of claim 17 comprising
a) a means for emitting actinic radiation; and
b) a means for advancing the article toward the means for emitting actinic radiation, in order to provide a triggered article.

19. The apparatus of claim 18 comprising a chamber within which the means for emitting actinic radiation is disposed.

20. The apparatus of claim 18 comprising a means for emitting ultraviolet light.

* * * * *